US009596248B2

(12) United States Patent
Duan et al.

(10) Patent No.: US 9,596,248 B2
(45) Date of Patent: Mar. 14, 2017

(54) TROJAN DETECTION METHOD AND DEVICE

(71) Applicant: NSFOCUS INFORMATION TECHNOLOGY CO., LTD., Haidian District, Beijing (CN)

(72) Inventors: Yuxuan Duan, Beijing (CN); Lijun Cheng, Beijing (CN); Peng Han, Beijing (CN)

(73) Assignee: NSFOCUS INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/366,665

(22) PCT Filed: Dec. 18, 2012

(86) PCT No.: PCT/CN2012/086871
§ 371 (c)(1),
(2) Date: Jun. 18, 2014

(87) PCT Pub. No.: WO2013/091534
PCT Pub. Date: Jun. 27, 2013

(65) Prior Publication Data
US 2014/0344935 A1 Nov. 20, 2014

(30) Foreign Application Priority Data
Dec. 20, 2011 (CN) .......................... 2011 1 0430821

(51) Int. Cl.
H04L 29/06 (2006.01)
(52) U.S. Cl.
CPC .......... H04L 63/1416 (2013.01); H04L 63/14 (2013.01); H04L 63/1408 (2013.01)

(58) Field of Classification Search
CPC . H04L 63/14; H04L 63/1408; H04L 63/1416; H04L 63/1425; H04L 63/145
(Continued)

(56) References Cited

U.S. PATENT DOCUMENTS 8,402,543 B1 * 3/2013 Ranjan et al. .................. 726/23
8,578,493 B1 * 11/2013 Cowan .................. G06F 21/554
709/224

(Continued)

FOREIGN PATENT DOCUMENTS

CN   101587527 A   11/2009
CN   102201937 A    9/2011
(Continued)

OTHER PUBLICATIONS

Zhao, Tianfu et al., "Detecting Rebound Port Trojan Based on Network Behavior Analysis", Netinfo Security, 2011, No. 9, Sep. 15, 2011, sections 2-3.
(Continued)

*Primary Examiner* — Eleni Shiferaw
*Assistant Examiner* — Alexander Lapian
(74) *Attorney, Agent, or Firm* — TIPS Group (57) ABSTRACT

A trojan detection method and device, used to solve the problem in the prior art of being unable to effectively detect a trojan in a network, the method comprising: when a trojan heartbeat is detected in a session, according to whether the trojan heartbeat detection frequency is fixed, increasing the recorded session weight by a corresponding weight and recording the increased weight, and checking whether each packet transmitted from a controlling end to a controlled end complies with the characteristics of a trojan control command packet; if yes, then increasing by a third weight onto the recorded session weight and recording the same, and when the session weight reaches an alarm threshold, gen-
(Continued)

erating an alarm to notify that the session is initiated by a trojan. An embodiment of the present invention achieves trojan detection by detecting the packet in the session, thereby the trojan in a network can be detected. The detection to the packet in the session is not simply string matching, thus reducing false alarm rate and effectively detecting the trojan in the network.

10 Claims, 3 Drawing Sheets

(58) Field of Classification Search
USPC .......................................................... 726/24
See application file for complete search history.

(56) References Cited

U.S. PATENT DOCUMENTS

| | | | |
|---|---|---|---|
| 8,904,520 B1* | 12/2014 | Nachenberg et al. | 726/22 |
| 2005/0022018 A1* | 1/2005 | Szor | 713/201 |
| 2005/0075842 A1* | 4/2005 | Ormazabal | H04L 63/1433 702/188 |
| 2005/0281291 A1* | 12/2005 | Stolfo et al. | 370/506 |
| 2008/0028467 A1* | 1/2008 | Kommareddy et al. | 726/23 |
| 2009/0077663 A1* | 3/2009 | Sun et al. | 726/23 |
| 2010/0284283 A1* | 11/2010 | Golic et al. | 370/242 |
| 2012/0005743 A1* | 1/2012 | Kitazawa et al. | 726/13 |
| 2012/0198277 A1* | 8/2012 | Busser et al. | 714/26 |

FOREIGN PATENT DOCUMENTS

| | | |
|---|---|---|
| CN | 102202064 A | 9/2011 |
| CN | 102523223 A | 6/2012 |
| WO | WO 2004021197 A | 3/2004 |

OTHER PUBLICATIONS

Yan, Huijuan et al., "The Trojan Horse Detection System Based on Behavioral Analysis", Henan University of Technology, Henan, China, Aug. 2010, pp. 9-11.

* cited by examiner

TROJAN DETECTION METHOD AND DEVICE

This application is a U.S. National Stage of International Application No. PCT/CN2012/086871, filed on Dec. 18, 2012, designating the United States, and claiming the benefit of Chinese Patent Application No. 201110430821.5, filed with the Chinese Patent Office on Dec. 20, 2011 and entitled "Method of and apparatus for detecting Trojan", which is hereby incorporated by reference in its entirety.

FIELD

The present invention relates to the field of communications, and particularly to a method of and apparatus for detecting Trojan.

BACKGROUND

Along with constant popularization of Internet technologies, the issue of network security has become increasingly prominent, and especially the flooding of Trojan program may directly result in illegal embezzlement and corruption of various types of important information. At present the Trojan program has become a common means for a network attacker to make an attack, where the attacker may obtain a control privilege of a target host and embezzle a user account, a user password and other important information by means of the Trojan program. For this reason, how to detect, intercept and protect against Trojan has become an issue highly desirable to be addressed.

In the prior art, Trojan is detected by matching a characteristic of a local file generated by some program, e.g., the characteristic string, size, directory or another characteristic of the file, with a characteristic of a local file generated by Trojan program and monitoring locally some normal operational behaviors of the program, e.g., modification of a registry, setting of a file self-startup option, modification of a system file configuration and other behaviors for the purpose of detecting the Trojan program.

However this approach is limited only to detection of local Trojan but fails to detect and protect against Trojan in the network. Moreover Trojan is well known for its "capriciousness", and it may be also difficult to detect various variants of Trojan effectively by detecting Trojan merely based upon an analysis of a static file.

Trojan is detected in the prior art alternatively by extracting common strings of characters in communication data streams of Trojan, creating a library of common strings of characters and matching a string of characters in a communication data stream of the network with the strings of characters in the library of common strings of characters and confirming the presence of Trojan in communication if there is a successful match.

However there are a variety of communication protocols and communication data in the network, so there will definitely a high ratio of false alarms in this approach only with simple matching of strings of characters.

In view of this, it is impossible for the approaches of detecting Trojan in the prior art to detect Trojan in the network effectively.

SUMMARY

Embodiments of the invention provide a method of and apparatus for detecting Trojan so as to address the problem in the prior art of failing to detect Trojan in a network effectively.

An embodiment of the invention provides a method of detecting Trojan, the method includes:

detecting whether Trojan heartbeat detection is present in a session between a control end and a controlled end according to each message sent by the control end to the controlled end;

continuing with detecting whether the Trojan heartbeat detection is present in the session upon detecting the absence of Trojan heartbeat detection;

judging whether the frequency of Trojan heartbeat detection in the session is fixed upon detecting the presence of Trojan heartbeat detection, and if so, then increasing by a first weight and recording a recorded session weight; otherwise, increasing by a second weight and recording the recorded session weight; and for each message sent by the control end to the controlled end, detecting whether a characteristic of the message conforms with a characteristic of a Trojan control command message; and if the characteristic of the message conforms with the characteristic of the Trojan control command message, then increasing by a third weight and recording the recorded session weight; otherwise, continuing with detecting whether a characteristic of a next message conforms with the characteristic of the Trojan control command message; and issuing an alarm to notify that the session is a Trojan initiated session when the recorded session weight reaches an alarm threshold.

An embodiment of the invention provides an apparatus for detecting Trojan, the apparatus includes:

a heartbeat detection module configured to detect whether Trojan heartbeat detection is present in a session between a control end and a controlled end according to each message sent by the control end to the controlled end and to continue with detecting whether the Trojan heartbeat detection is present in the session upon detecting the absence of Trojan heartbeat detection;

a frequency detection module configured to judge whether the frequency of Trojan heartbeat detection in the session is fixed when the heartbeat detection module detects the presence of Trojan heartbeat detection;

a control command detection module configured, for each message sent by the control end to the controlled end, to detect whether a characteristic of the message conforms with a characteristic of a Trojan control command message when the heartbeat detection module detects the presence of Trojan heartbeat detection, and if the characteristic of the message doesn't conform with the characteristic of the Trojan control command message, to continue with detecting whether a characteristic of a next message conforms with the characteristic of the Trojan control command message;

a weight record module configured to increase by a first weight and record a recorded session weight when the frequency detection module confirms the frequency of Trojan heartbeat detection in the session to be fixed, to increase by a second weight and record the recorded session weight when the frequency detection module confirms the frequency of Trojan heartbeat detection in the session to be unfixed, and to increase by a third weight and record the recorded session weight when the control command detection module confirms the characteristic of the message to conform with the characteristic of the Trojan control command message; and an alarm module configured to issue an alarm to notify that the session is a Trojan initiated session when the session weight recorded by the weight record module reaches an alarm threshold.

The embodiments of the invention provide a method of and apparatus for detecting Trajan, and in the method, for some session initiated by the control end to the controlled end, when the presence of Trojan heartbeat detection in the session is detected, a recorded session weight is increased by a corresponding weight and recorded according to whether the frequency of the Trojan heartbeat detection is fixed, and for each message sent by the control end to the controlled end, whether a characteristic of the message conforms with a characteristic of a Trojan control command message is detected, and if the characteristic of the message conforms with the characteristic of a Trojan control command message, then the recorded session weight is increased by a third weight and recorded, and an alarm is issued to notify that the session is a Trojan initiated session when the recorded session weight reaches the alarm threshold. Since in the embodiments of the invention, Trojan detection is performed by detecting a message in a session, Trojan in a network can be detected, and since the message in the session is detected instead of simply matching strings of characters, the rate of false alarms can be lowered and Trojan in the network can be detected effectively.

DETAILED DESCRIPTION OF THE EMBODIMENTS

Since there is Trojan heartbeat detection present in nearly all Trojan initiated sessions, it can be judged whether a session is a Trojan initiated session by detecting whether Trojan heartbeat detection is present in the session. Moreover since there is also some special characteristic of a message sent by a control end to a controlled end as a Trojan control command in a Trojan initiated session, it can be judged whether a session is a Trojan initiated session by detecting whether a message in the session conforms with the characteristic of the Trojan control command. In embodiments of the invention, Trojan can be detected by Trojan heartbeat detection in combination with a Trojan control command to detect Trojan in a network at a lower rate of false alarms so as to detect Trojan in a network effectively.

The embodiments of the invention will be described below in details with reference to the drawings.

Figure 1:
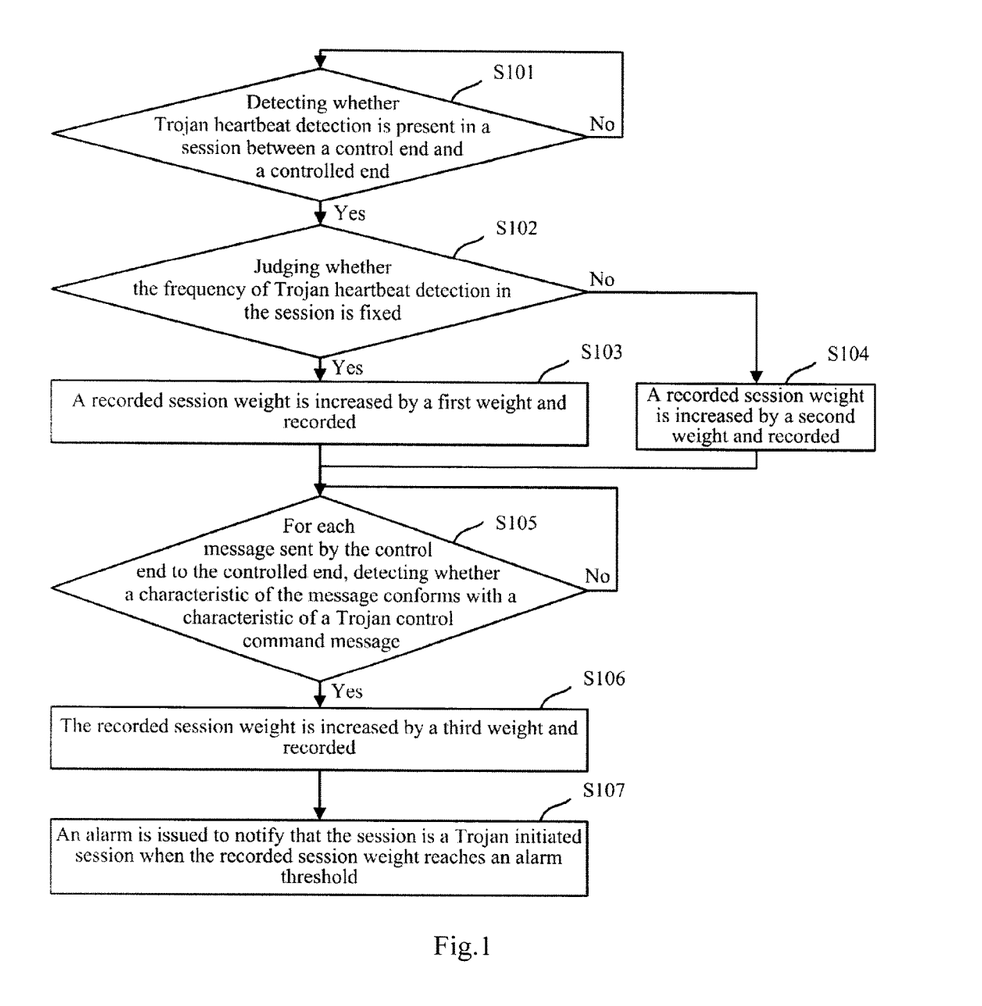
FIG. 1 illustrates a process of detecting Trojan according to an embodiment of the invention.

FIG. 1 illustrates a process of detecting Trojan according to an embodiment of the invention, the process particularly including the following steps:

S101: It is detected whether Trojan heartbeat detection is present in a session between a control end and a controlled end according to each message sent by the control end to the controlled end, and if the presence of Trojan heartbeat detection is detected, then the process goes to the step S102; otherwise, the process goes back to the step S101.

In the embodiment of the invention, an initiating end of a session is referred to as a control end, and an accepting end of the session is referred to as a controlled end, and heartbeat detection can be detected in the session according to each message sent by the control end to the controlled end, and particularly whether Trojan heartbeat detection is present in the session can be detected according to a characteristic of each message sent by the control end to the controlled end. If the presence of Trojan heartbeat detection is detected, then it indicates that the session is likely to be a Trojan initiated session, and the process goes to the following steps of detecting a control command message. If the absence of Trojan heartbeat detection is detected, then the process continues with detecting whether Trojan heartbeat detection is present in the session, that is, the process goes back to the step S101.

S102: It is judged whether the frequency of Trojan heartbeat detection in the session is fixed, and if the frequency is fixed, then the process goes to the step S103; otherwise, the process goes to the step S104.

Since typically the frequency of Trojan heartbeat detection is constant while the frequency of heartbeat detection in a normal session is changing, it can be further judged whether the frequency of the Trojan heartbeat detection is fixed upon detecting the presence of the Trojan heartbeat detection in the session.

In the embodiment of the invention, a session weight corresponding to the session has been stored in advance for detecting whether the session is a Trojan initiated session, where an initial value of the session weight is 0. The session weight characterizes the extent of suspiciousness that the session is a Trojan initiated session, where a higher recorded session weight indicates a higher probability that the session is a Trojan initiated session. Thus in order to further improve the accuracy of detecting Trojan, when the presence of Trojan heartbeat detection is confirmed, the session weight can be increased by a corresponding weight according to whether the frequency of the Trojan heartbeat detection is fixed. If there is Trojan heartbeat detection at a fixed frequency, then it indicates a higher extent of suspiciousness that the session is a Trojan initiated session and the recorded session weight is further increased by a higher weight. On the contrary, if there is Trojan heartbeat detection at a changing frequency, then it indicates a lower extent of suspiciousness that the session is a Trojan initiated session but the recorded session weight is still increased by a lower weight due to the presence of Trojan heartbeat detection.

S103: A recorded session weight is increased by a first weight and recorded, and the process goes to the step S105.

S104: A recorded session weight is increased by a second weight and recorded, and the process goes to the step S105.

Wherein, the first weight is larger than the second weight.

S105: For each message sent by the control end to the controlled end, it is detected whether a characteristic of the message conforms to a characteristic of a Trojan control command message, and if the characteristic of the message conforms with that of the Trojan control command message, then the process goes to the step S106; otherwise, the process goes back to the step S105.

In the embodiment of the invention, when the presence of Trojan heartbeat detection in the session is confirmed, it is detected whether a characteristic of each message in the session conforms with the characteristic of a Trojan control command message to further detect whether the session is a Trojan initiated session. Moreover for each message, if the characteristic of the message is confirmed not to conform with the characteristic of a Trojan control command message, then the process continues with detecting whether a characteristic of a next message conforms with the characteristic of a Trojan control command message, that is, the process goes back to the step S105.

S106: The recorded session weight is increased by a third weight and recorded.

Since the session weight characterizes the extent of suspiciousness that the session is a Trojan initiated session, where a higher recorded session weight indicates a higher probability that the session is a Trojan initiated session. In the embodiment of the invention, after the presence of Trojan heartbeat detection in the session is detected, each detected message conforming with the characteristic of a Trojan control command message indicates a somewhat higher probability that the session is a Trojan initiated session, and the recorded session weight is increased by the third weight and recorded.

S107: An alarm is issued to notify that the session is a Trojan initiated session when the recorded session weight reaches an alarm threshold.

Since the recorded session weight is increased once by the third weight each time a message conforming with the characteristic of a Trojan control command message, if the recorded session weight reaches the preset alarm threshold, then the session is confirmed to be a Trojan initiated session and further an alarm is issued, wherein the alarm threshold can be preset as needed.

In the foregoing process, for a session initiated by the control end to the controlled end, when the presence of Trojan heartbeat detection in the session is detected, a recorded session weight is increased by a corresponding weight and recorded according to whether the frequency of the Trojan heartbeat detection is fixed, and for each message sent by the control end to the controlled end, whether a characteristic of the message conforms with a characteristic of a Trojan control command message is detected, and if a characteristic of the message conforms with that of a Trojan control command message, then the recorded session weight is increased by a third value and recorded, and an alarm is issued to notify that the session is a Trojan initiated session when the recorded session weight reaches the alarm threshold. Since in the embodiment of the invention, Trojan detection is performed by detecting a message in a session, Trojan in a network can be detected, and since the message in the session is detected instead of simply matching strings of characters, the rate of false alarms can be lowered and Trojan in the network can be detected effectively.

In the step S101 illustrated in FIG. 1, whether Trojan heartbeat detection is present in the session between the control end and the controlled end can be detected according to the number of respective messages, sent by the control end to the controlled end, conforming with a characteristic of a Trojan heartbeat detection message. Particularly for each message sent by the control end to the controlled end, it is judged whether the characteristic of the message conforms with the characteristic of a Trojan heartbeat detection message according to the stored characteristic of a Trojan heartbeat detection message, and if the characteristic of the message confirms with that of a Trojan heartbeat detection message, then the currently recorded number of Trojan heartbeat detection messages is increased by 1; otherwise, it is further judged whether the characteristic of the next message conforms with the characteristic of a Trojan heartbeat detection message; and when the recorded number of Trojan heartbeat detection messages reaches a preset number, the presence of Trojan heartbeat detection in the session is confirmed, and when the recorded number of Trojan heartbeat detection messages does not reach the preset number, the absence of Trojan heartbeat detection in the session is confirmed. That is, the currently recorded number of Trojan heartbeat detection messages is increased by 1 each time a message, sent by the control end to the controlled end, conforming with the characteristic of a Trojan heartbeat detection message, where the initial value of the number of Trojan heartbeat detection messages is 0. When the number of messages conforming with the characteristic of a Trojan heartbeat detection message reaches the preset number, that is, when the recorded number reaches the preset number, the presence of Trojan heartbeat detection in the session is confirmed, and the process goes to the subsequent steps of detecting the frequency and the control command message.

Wherein, the characteristic of a Trojan heartbeat detection message can be among pre-collected characteristics of a heartbeat detection message in a Trojan session. Particularly the characteristic of a Trojan heartbeat detection message can include the following characteristics:

A message of a Trojan initiated session is typically transmitted and received via upper ports, that is, a source port number and a destination port number of the message in the session are larger than a preset value which can be determined under a real condition. For example at present an upper port typically refers to a port with a port number above 1024, so a source port number and a destination port number corresponding to a message in a Trojan initiated session are typically above 1204.

The length of payload in a heartbeat detection message in a Trojan initiated session is typically also in some range, and the length of payload per heartbeat detection message is fixed, and this range can also be determined under a real condition. For example at present the length of payload in a heartbeat detection message in a Trojan initiated session is typically not above 100 bytes, and the length of payload is fixed.

The contents of a payload of a heartbeat detection message in a Trojan initiated session are typically fixed, and for different variants of particular Trojan, the contents of a payload of a heartbeat detection message in a Trojan variant initiated session may also be fixed or may regularly vary somehow.

Thus in the embodiment of the invention, based on the aggregated characteristics of a heartbeat detection message, for each message sent by the control end to the controlled end, the characteristic of the message is confirmed to conform with the characteristic of a Trojan heartbeat detection message particularly by confirming the characteristic of the message to conform with the characteristic of a Trojan heartbeat detection message when the characteristic of the message conforms one or more of the following characteristics:

Both a source port number and a destination port number corresponding to the message are above a preset value which can be 1024;

The length of payload of the message is in a first preset range which can be below 100 bytes:

The length of payload of the message is the same as the length of payload of each preceding message, that is, the length of payload per message is fixed; and The contents of a payload of the message are the same as or regularly vary from the contents of a payload of each preceding message, that is, the contents of a payload per message are the same or regularly vary.

In order to further improve the accuracy of detecting Trojan, a characteristic of the message conforming with the characteristic of a Trojan heartbeat detection message can alternatively be detected by confirming the characteristic of the message to conform with the characteristic of a Trojan heartbeat detection message upon judging the characteristic of the message to conform with all the characteristics above and by confirming the characteristic of the message not to conform with the characteristic of a Trojan heartbeat detection message upon judging the characteristic of the message not to conform with at least one of the above characteristics.

Furthermore in the step S102 illustrated in FIG. 1, it can be judged whether the frequency of Trojan heartbeat detection in the session is fixed by ranking respective confirmed messages conforming with the characteristic of a Trojan heartbeat detection message in a sequential order of message transmission time carried in the respective confirmed messages conforming with the characteristic of a Trojan heartbeat detection message, determining time intervals between the message transmission time of every two adjacent messages respectively among the ranked messages, judging whether each of the differences between the respectively determined time intervals is in a second preset range, and if so, then confirming the frequency of Trojan heartbeat detection in the session to be fixed; otherwise, confirming the frequency of Trojan heartbeat detection in the session to be unfixed, wherein the second preset range can be preset as needed, for example, below 1 second.

In the step S105 illustrated in FIG. 1, for each message sent by the control end to the controlled end, a characteristic of the message conforming with the characteristic of a Trojan control command message can alternatively be detected with the characteristic of a Trojan control command message being among pre-aggregated characteristics of a control command message in a Trojan session. Particularly the characteristic of a control command message in a Trojan initiated session can include the following characteristics:

The length of payload of a control command message in a Trojan initiated session is also in some range which can be preset under a real condition. For example at present the length of payload of a control command message in a Trojan initiated session is typically below 100 bytes.

A field structure of a control command message in a Trojan initiated session has some structural characteristic, for example, first 4 bytes of a payload specify the length of a subsequent payload. A library of Trojan characteristics can be pre-stored in which pre-aggregated field structures of a control command message in a Trojan initiated session are stored.

Encoding of each control command message in a Trojan initiated session regularly varies, for example, encoding in an order of transmission.

The controlled end is typically controlled by multiple control command messages to perform multiple operational behaviors in a Trojan initiated session, and the combination of these multiple operational behaviors tends to have some characteristic, for example, some file folder is firstly searched and then opened, and further a file of some type in this file folder is uploaded. Alike assembled combinations of multiple operational behaviors performed by the controlled end as controlled by Trojan can be stored in the library of Trojan characteristics.

Thus in the embodiment of the invention, based on the aggregated characteristics of a Trojan control command message, for each message sent by the control end to the controlled end, the characteristic of the message is confirmed to conform with the characteristic of a Trojan control command message particularly by confirming the characteristic of the message to conform with the characteristic of a Trojan control command message when the characteristic of the message conforms with one or more of the following characteristics:

The length of payload of the message is in a third preset range which can be below 100 bytes;

A field structure of the message is the same as at least one field structure of a Trojan control command stored;

Encoding of the message regularly varies from encoding of each preceding message; and An operational behavior corresponding to the message is combined with an operational behavior corresponding to each preceding message, according to the order in which the respective messages are sent by the control end, to form a combination of operational behaviors of the session, and the formed combination of operational behaviors of the session is the same as at least one combination of Trojan operational behaviors stored.

In order to further improve the accuracy of detecting Trojan, a characteristic of the message conforming with the characteristic of a Trojan control command message can alternatively be detected by confirming the characteristic of the message to conform with the characteristic of a Trojan control command message upon judging the characteristic of the message to conform with all the characteristics above and by confirming the characteristic of the message not to conform with the characteristic of a Trojan control command message upon judging the characteristic of the message not to conform with at least one of the above characteristics.

Since a message with a large payload is typically transmitted immediately in a normal session after the session is set up, and a message with a large payload is transmitted in a Trojan initiated session after a period of time elapses after the session is set up, thus in the embodiment of the invention, in order to further improve the accuracy of detecting Trojan, it can be further judged whether the session is a Trojan initiated session according to a time interval between the time when the session is set up and the time when the message with a large payload occurs. If the message with a large payload occurs in a short period of time after the session is set up, then it indicates a low extent of suspiciousness that the session is a Trojan initiated session, and the recorded session weight will not be increased, and if the message with a large payload occurs in a long period of time after the session is set up, then it indicates a high extent of suspiciousness that the session is a Trojan initiated session, and the recorded session weight is increased by some weight.

Particularly the sending time when a session setup message of the session is sent by the control end is determined, the occurrence time when a message with the length of payload above a preset length occurs for the first time in the course of the session, and a time interval from the sending time to the occurrence time is determined, and when the determined time interval is larger than a preset time interval, the recorded session weight is increased by a fourth weight and recorded, where the preset length can be preset as needed, for example, 1200 bytes, and the fourth weight can also be preset as needed.

Furthermore since data traffic uploaded by the controlled end to the control end is far above data traffic, sent by the control end, received by the controlled end in a Trojan initiated session, that is, the amount of uplink data traffic of the controlled end is far above the amount of downlink data traffic thereof, but such a characteristic is absent with data traffic in a normal session. Thus in the embodiment of the invention, in order to further improve the accuracy of detecting Trojan, it can be further detected whether the session is a Trojan initiated session according to the ratio of uplink data traffic of the controlled end to downlink data traffic thereof in the session. Moreover different ratio ranges can be preset with a weight corresponding to each of the ratio ranges, and the currently recorded session weight can be increased by the weight corresponding to the ratio range into which the ratio falls. For example there are a corresponding weight A when the ratio of uplink data traffic to downlink data traffic falls into the ratio range 1 to 50, a corresponding weight B for 50 to 100 and a corresponding weight C for above 100, where the larger the average of each ratio range is, the higher the weight corresponding thereto will be, that is, C>B>A, or a higher ratio of uplink data traffic to downlink data traffic indicates a higher extent of suspiciousness that the session is a Trojan initiated session.

Preferably in order to improve the efficiency of detecting Trojan, the step above of detection according to the ratio of uplink data traffic of the controlled end to downlink data traffic thereof can be performed after the currently recorded session weight reaches a preset threshold which is below the alarm threshold. Particularly when the recorded session weight reaches the preset threshold, uplink data traffic and downlink data traffic of the controlled end in the current session are determined, the ratio of the uplink data traffic to the downlink data traffic are determined, and then a ratio range into which the ratio falls is determined, and the recorded session weight is increased by a weight corresponding to the ratio range into which the determined ratio falls according to weights corresponding to respective preset ratio ranges and recorded. Stated differently, when the recorded session weight reaches the preset threshold, uplink data traffic and downlink data traffic of the controlled end in the course of the session from when the session is set up to the current time are determined, the ratio of them is determined, and the currently recorded session weight is increased according to the ratio.

Figure 2:
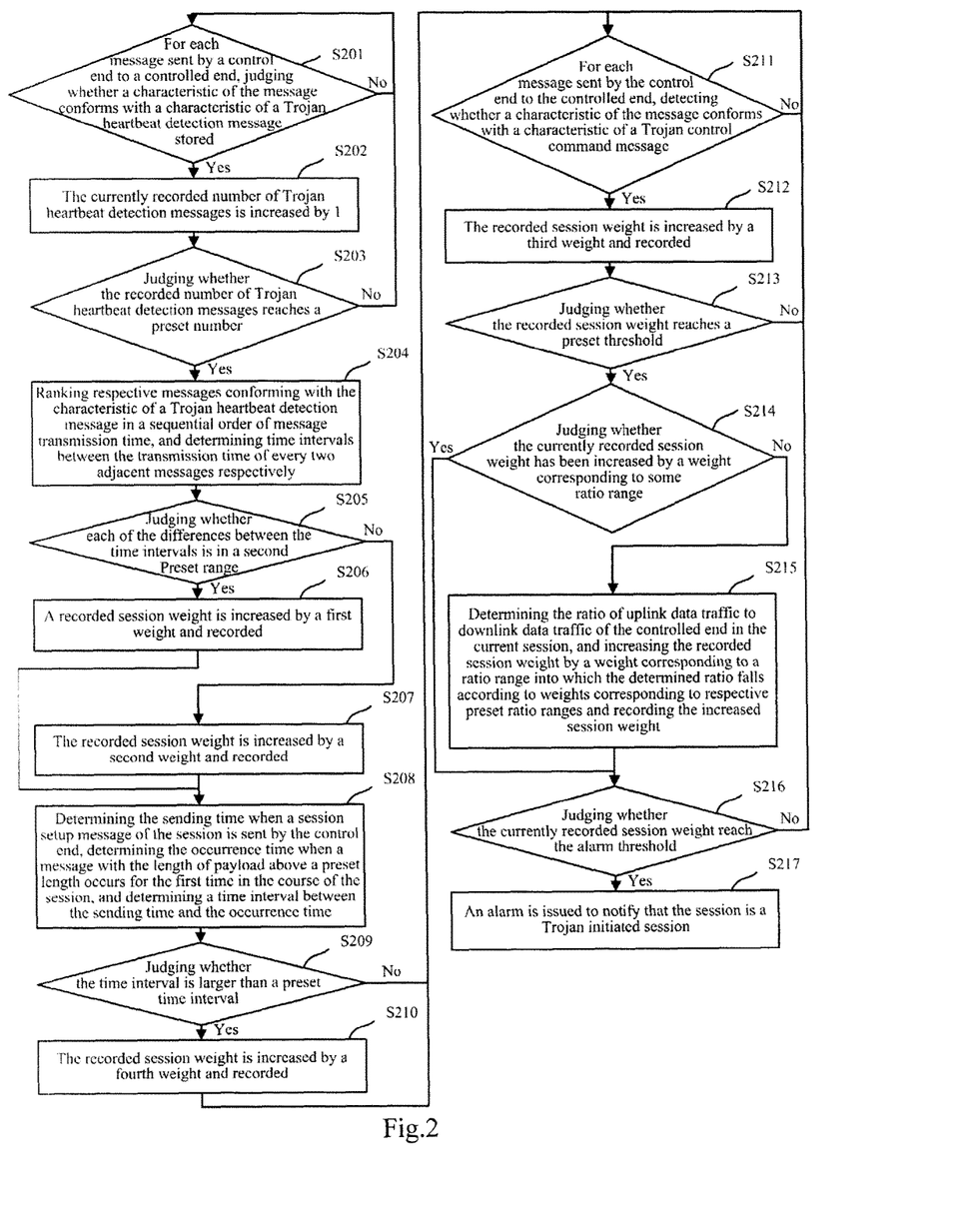
FIG. 2 illustrates a detailed process of detecting Trojan according to an embodiment of the invention.

FIG. 2 illustrates a detailed process of detecting Trojan according to an embodiment of the invention, the process particularly including the following steps:

S201: For each message sent by a control end to a controlled end, it is judged whether a characteristic of the message conforms with a characteristic of a Trojan heartbeat detection message stored according to the characteristic of a Trojan heartbeat detection message, and if so, then the process goes to the step 202; otherwise, the process goes back to the step S201.

S202: The currently recorded number of Trojan heartbeat detection messages is increased by 1.

S203: It is judged whether the recorded number of Trojan heartbeat detection messages reaches a preset number, and if so, then the process goes to the step 204; otherwise, the process goes back to the step S201.

S204: Respective confirmed messages conforming with the characteristic of a Trojan heartbeat detection message are ranked in a sequential order of message transmission time carried in the respective confirmed messages conforming with the characteristic of a Trojan heartbeat detection message, and time intervals between the transmission time of every two adjacent messages are determined respectively among the ranked messages.

S205: It is judged whether each of the differences between the respectively determined time intervals is in a second preset range, and if so, then the process goes to the step S206; otherwise, the process goes to the step S207.

S206: A recorded session weight is increased by a first weight and recorded, and the process goes to the step S208.

S207: The recorded session weight is increased by a second weight and recorded, and the process goes to the step S208

Wherein, an initial value of the session weight is 0 and the first weight is larger than the second weight.

S208: The sending time when a session setup message of the session is sent by the control end is determined, the occurrence time when a message with the length of payload above a preset length occurs for the first time in the course of the session is determined, and a time interval from the sending time to the occurrence time is determined.

S209: It is judged whether the time interval is larger than a preset time interval, and if so, then the process goes to the step S210; otherwise, the process goes to the step S211.

S210: The recorded session weight is increased by a fourth weight and recorded, and the process goes to the step S211.

S211: For each message sent by the control end to the controlled end, it is detectred whether a characteristic of the message conforms with a characteristic of a Trojan control command message, and if so, then the process goes to the step S212; otherwise, the process goes back to the step S211.

S212: The recorded session weight is increased by a third weight and recorded.

S213: It is judged whether the recorded session weight reaches a preset threshold, and if so, then the process goes to the step S214; otherwise, the process goes to the step S211.

Wherein, the preset threshold is smaller than an alarm threshold.

S214: It is judged whether the currently recorded session weight has been increased by a weight corresponding to some ratio range, and if so, then the process goes to the step S216; otherwise, the process goes to the step S215.

That is, it is judged whether the step of increasing by a corresponding weight according to the ratio of uplink data traffic to downlink data traffic of the controlled end, i.e., the step S215, has been performed in the detection process.

S215: The ratio of uplink data traffic to downlink data traffic of the controlled end in the current session is determined, and the recorded session weight is increased by a weight corresponding to a ratio range into which the determined ratio falls according to weights corresponding to respective preset ratio ranges and recorded, and the process goes to the step S216.

S216: It is judged whether the currently recorded session weight reaches the alarm threshold, and if so, then the process goes to the step S217; otherwise, the process goes back to the step S211.

S217: An alarm is issued to notify that the session is a Trojan initiated session.

Moreover the foregoing process can be started when the session is set up and terminated at the end of the session, and if the recurrently recorded session weight does not reach the alarm threshold at the end of the session, then it indicates that the session is not a Trojan initiated session.

Figure 3:
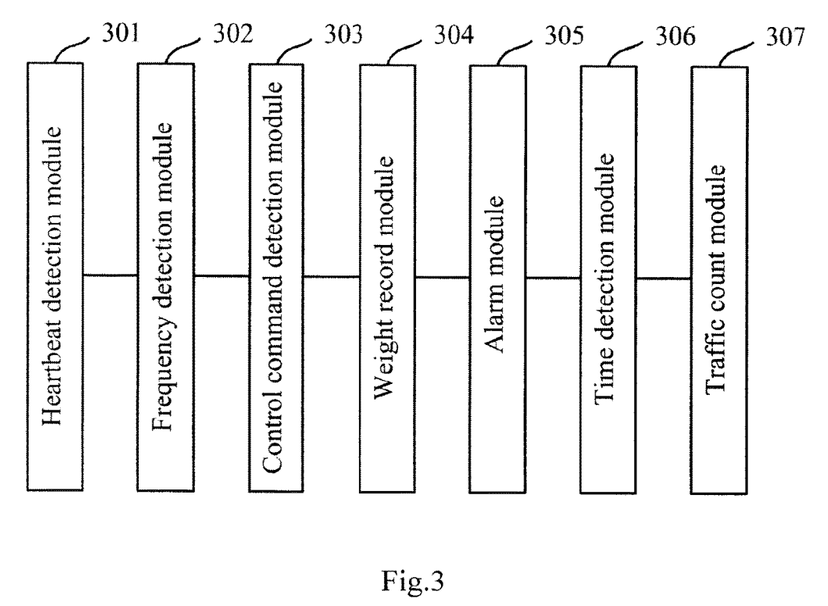
FIG. 3 illustrates a schematic structural diagram of an apparatus for detecting Trojan according to an embodiment of the invention.

FIG. 3 illustrates a schematic structural diagram of an apparatus for detecting Trojan according to an embodiment of the invention, the apparatus particularly including:

A heartbeat detection module 301 is configured to detect whether Trojan heartbeat detection is present in a session between a control end and a controlled end according to each message sent by the control end to the controlled end and to continue with detecting whether the Trojan heartbeat detection is present in the session upon detecting the absence of Trojan heartbeat detection;

A frequency detection module 302 is configured to judge whether the frequency of Trojan heartbeat detection in the session is fixed when the heartbeat detection module 301 detects the presence of Trojan heartbeat detection;

A control command detection module 303 is configured, for each message sent by the control end to the controlled end, to detect whether a characteristic of the message conforms with a characteristic of a Trojan control command message when the heartbeat detection module 301 detects the presence of Trojan heartbeat detection, and if the characteristic of the message doesn't conforms with that of a Trojan control command message, to continue with detecting whether a characteristic of a next message conforms with the characteristic of a Trojan control command message;

A weight record module 304 is configured to increase by a first weight and record a recorded session weight when the frequency detection module 302 confirms the frequency of Trojan heartbeat detection in the session to be fixed, to increase by a second weight and record the recorded session weight when the frequency detection module 302 confirms the frequency of Trojan heartbeat detection in the session to be unfixed, and to increase by a third weight and record the recorded session weight when the control command detection module 303 confirms the characteristic of the message to conform with the characteristic of a Trojan control command message; and An alarm module 305 is configured to issue an alarm to notify that the session is a Trojan initiated session when the session weight recorded by the weight record module 304 reaches an alarm threshold.

The heartbeat detection module 301 is particularly configured, for each message sent by the control end to the controlled end, to judge whether the characteristic of the message conforms with the characteristic of a Trojan heartbeat detection message according to the characteristic of a Trojan heartbeat detection message stored, and if the characteristic of the message conforms with the characteristic of a Trojan heartbeat detection message, to increase the currently recorded number of Trojan heartbeat detection messages by 1; otherwise, to further judge whether the characteristic of the next message conforms with the characteristic of a Trojan heartbeat detection message; and when the recorded number of Trojan heartbeat detection messages reaches a preset number, to confirm the presence of Trojan heartbeat detection in the session, and when the recorded number of Trojan heartbeat detection messages does not reach the preset number, to confirm the absence of Trojan heartbeat detection in the session.

The heartbeat detection module 301 is particularly configured to confirm the characteristic of the message to conform with the characteristic of a Trojan heartbeat detection message when the characteristic of the message conforms with one or more of the following characteristics: both a source port number and a destination port number corresponding to the message are above a preset value; and the length of payload of the message is in a first preset range; and the length of payload of the message is the same as the length of payload of each preceding message; and the contents of a payload of the message are the same as or regularly vary from the contents of a payload of each preceding message.

The frequency detection module 302 is particularly configured to rank respective confirmed messages conforming with the characteristic of a Trojan heartbeat detection message in a sequential order of message transmission time carried in the respective confirmed messages conforming with the characteristic of a Trojan heartbeat detection message, to determine time intervals between the message transmission time of every two adjacent messages respectively among the ranked messages, to judge whether each of the differences between the respectively determined time intervals is in a second preset range, and if so, to confirm the frequency of Trojan heartbeat detection in the session to be fixed; otherwise, to confirm the frequency of Trojan heartbeat detection in the session to be unfixed.

The control command detection module 303 is particularly configured to confirm the characteristic of the message to conform with the characteristic of a Trojan control command message when the characteristic of the message conforms with one or more of the following characteristics: the length of payload of the message is in a third preset range; a field structure of the message is the same as at least one field structure of a Trojan control command stored; encoding of the message regularly varies from encoding of each preceding message; and an operational behavior corresponding to the message is combined with an operational behavior corresponding to each preceding message, according to the order in which the respective messages are sent by the control end, to form a combination of operational behaviors of the session, and the formed combination of operational behaviors of the session is the same as at least one combination of Trojan operational behaviors stored.

The apparatus further includes:

A time detection module 306 is configured to determine a sending time when a session setup message of the session is sent by the control end, to determine an occurrence time when a message with the length of payload above a preset length occurs for the first time in the course of the session, and to determine a time interval from the sending time to the occurrence time; and The weight record module 304 is further configured to increase by a fourth weight and record the recorded session weight when the determined time interval is larger than a preset time interval.

The apparatus further includes:

A traffic count module 307 is configured, when the recorded session weight reaches a preset threshold, to determine uplink data traffic and downlink data traffic of the controlled end in the current session, to determine the ratio of the uplink data traffic to the downlink data traffic, and to determine a ratio range into which the ratio falls, where the preset threshold is smaller than the alarm threshold; and The weight record module 304 is further configured to increase the recorded session weight by a weight corresponding to the ratio range into which the determined ratio falls according to weights corresponding to respective preset ratio ranges and to record the session weight.

The embodiments of the invention provide a method of and apparatus for detecting Trajan, and in the method, for some session initiated by the control end to the controlled end, when the presence of Trojan heartbeat detection in the session is detected, a recorded session weight is increased by a corresponding weight and recorded according to whether the frequency of the Trojan heartbeat detection is fixed, and for each message sent by the control end to the controlled end, whether a characteristic of the message conforms with a characteristic of a Trojan control command message is detected, and if the characteristic of the message conforms with the characteristic of a Trojan control command message, then the recorded session weight is increased by a third weight and recorded, and an alarm is issued to notify that the session is a Trojan initiated session when the recorded session weight reaches the alarm threshold. Since in the embodiments of the invention, Trojan detection is performed by detecting a message in a session, Trojan in a network can be detected, and since the message in the session is detected instead of simply matching strings of characters, the rate of false alarms can be lowered and Trojan in the network can be detected effectively.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of detecting Trojan, the method comprising:
   detecting whether Trojan heartbeat detection is present in a session between a control end and a controlled end according to each message sent by the control end to the controlled end;
   continuing with detecting whether the Trojan heartbeat detection is present in the session upon detecting the absence of Trojan heartbeat detection;
   judging whether the frequency of Trojan heartbeat detection in the session is fixed upon detecting the presence of Trojan heartbeat detection, and if so, then increasing by a first weight and recording a recorded session weight; otherwise, increasing by a second weight and recording the recorded session weight, wherein, the first weight is larger than the second weight; and
   for each message sent by the control end to the controlled end, detecting whether a characteristic of the message conforms with a characteristic of a Trojan control command message; and
   if the characteristic of the message conforms with the characteristic of the Trojan control command message, then increasing by a third weight and recording the recorded session weight; otherwise, continuing with detecting whether a characteristic of a next message conforms with the characteristic of the Trojan control command message;
   determining a sending time when a session setup message of the session is sent by the control end;
   determining an occurrence time when a message with the length of payload above a preset length occurs for the first time in the course of the session;
   determining a time interval from the sending time to the occurrence time;
   increasing by a fourth weight and recording the recorded session weight when the determined time interval is larger than a preset time interval; and
   issuing an alarm to notify that the session is a Trojan initiated session when the recorded session weight reaches an alarm threshold;
   wherein detecting whether Trojan heartbeat detection is present in a session between a control end and a controlled end according to each message sent by the control end to the controlled end further comprises:
   for each message sent by the control end to the controlled end, judging whether the characteristic of the message conforms with the characteristic of the Trojan heartbeat detection message according to the characteristic of the Trojan heartbeat detection message stored;
   if the characteristic of the message conforms with the characteristic of the Trojan heartbeat detection message, then increasing a currently recorded number of Trojan heartbeat detection messages by 1; otherwise, further judging whether the characteristic of the next message conforms with the characteristic of the Trojan heartbeat detection message; and
   when the recorded number of Trojan heartbeat detection messages reaches a preset number, confirming the presence of Trojan heartbeat detection in the session, and
   when the recorded number of Trojan heartbeat detection messages does not reach the preset number, confirming the absence of Trojan heartbeat detection in the session.

2. The method according to claim 1, wherein the characteristic of the message conforming with the characteristic of a Trojan heartbeat detection message further comprises:

the characteristic of the message conforms with one or more of the following characteristics:

both a source port number and a destination port number corresponding to the message are above a preset value;

a length of payload of the message is in a first preset range;

the length of payload of the message is the same as the length of payload of each preceding message; and contents of the payload of the message are the same as or regularly vary from the contents of the payload of each preceding message.

3. The method according to claim 1, wherein judging whether the frequency of Trojan heartbeat detection in the session is fixed further comprises:

ranking respective confirmed messages conforming with the characteristic of the Trojan heartbeat detection message in a sequential order of message transmission time carried in the respective confirmed messages conforming with the characteristic of the Trojan heartbeat detection message;

determining time intervals between the message transmission time of every two adjacent messages respectively among the ranked messages;

judging whether each of the differences between the respectively determined time intervals is in a second preset range, and if so, confirming the frequency of Trojan heartbeat detection in the session to be fixed; otherwise, confirming the frequency of Trojan heartbeat detection in the session to be unfixed.

4. The method according to claim 1, wherein the characteristic of the message conforming with the characteristic of the Trojan control command message further comprises:

the characteristic of the message conforms with one or more of the following characteristics:

a length of payload of the message is in a third preset range;

a field structure of the message is the same as at least one field structure of a Trojan control command stored;

encoding of the message regularly varies from encoding of each preceding message; and an operational behavior corresponding to the message is combined with an operational behavior corresponding to each preceding message, according to an order in which the respective messages are sent by the control end, to form a combination of operational behaviors of the session, and the formed combination of operational behaviors of the session is the same as at least one combination of Trojan operational behaviors stored.

5. The method according to claim 1, wherein the method further comprises:

when the recorded session weight reaches a preset threshold, determining uplink data traffic and downlink data traffic of the controlled end in the current session, wherein the preset threshold is smaller than the alarm threshold;

determining the ratio of the uplink data traffic to the downlink data traffic, and determining a ratio range into which the ratio falls; and increasing the recorded session weight by a weight corresponding to the ratio range into which the determined ratio falls according to weights corresponding to respective preset ratio ranges, and recording the session weight.

6. An apparatus for detecting Trojan, the apparatus comprising:

a processor configured to (a) detect whether Trojan heartbeat detection is present in a session between a control end and a controlled end according to each message sent by the control end to the controlled end and to continue with detecting whether the Trojan heartbeat detection is present in the session upon detecting the absence of Trojan heartbeat detection;

(b) judge whether the frequency of Trojan heartbeat detection in the session is fixed upon the detection of Trojan heartbeat detection;

(c) for each message sent by the control end to the controlled end, to detect whether a characteristic of the message conforms with a characteristic of a Trojan control command message upon the detection of Trojan heartbeat detection, and if the characteristic of the message doesn't conform with the characteristic of the Trojan control command message, to continue with detecting whether a characteristic of a next message conforms with the characteristic of the Trojan control command message, to determine a sending time when a session setup message of the session is sent by the control end, to determine an occurrence time when a message with the length of payload above a preset length occurs for the first time in the course of the session, and to determine a time interval from the sending time to the occurrence time, and to issue an alarm to notify that the session is a Trojan initiated session when a session weight reaches an alarm threshold; and a memory coupled to the processor recording the session weight and configured to increase by a first weight and record a recorded session weight when the processor confirms the frequency of Trojan heartbeat detection in the session to be fixed, to increase by a second weight and record the recorded session weight when the processor confirms the frequency of Trojan heartbeat detection in the session to be unfixed, wherein the first weight is larger than the second weight, to increase by a third weight and record the recorded session weight when the processor confirms the characteristic of the message to conform with the characteristic of the Trojan control command message, and to increase by a fourth weight and record the recorded session weight when the determined time interval is larger than a preset time interval;

wherein the processor is further configured, for each message sent by the control end to the controlled end, to judge whether the characteristic of the message conforms with the characteristic of the Trojan heartbeat detection message according to the characteristic of the Trojan heartbeat detection message stored, and if the characteristic of the message conforms with the characteristic of the Trojan heartbeat detection message, to increase a currently recorded number of Trojan heartbeat detection messages by 1; otherwise, to further judge whether the characteristic of the next message conforms with the characteristic of the Trojan heartbeat detection message; and when the recorded number of Trojan heartbeat detection messages reaches a preset number, to confirm the presence of Trojan heartbeat detection in the session, and when the recorded number of Trojan heartbeat detection messages does not reach the preset number, to confirm the absence of Trojan heartbeat detection in the session.

7. The apparatus according to claim 6, wherein the processor is further configured to confirm the characteristic of the message to conform with the characteristic of the Trojan heartbeat detection message when the characteristic of the message conforms with one or more of the following characteristics: both a source port number and a destination port number corresponding to the message are above a preset value; a length of payload of the message is in a first preset range; the length of payload of the message is the same as the length of payload of each preceding message; and contents of payload of the message are the same as or regularly vary from the contents of payload of each preceding message.

8. The apparatus according to claim 6, wherein the processor is further configured to rank respective confirmed messages conforming with the characteristic of the Trojan heartbeat detection message in a sequential order of message transmission time carried in the respective confirmed messages conforming with the characteristic of the Trojan heartbeat detection message, to determine time intervals between the message transmission time of every two adjacent messages respectively among the ranked messages, to judge whether each of the differences between the respectively determined time intervals is in a second preset range, and if so, to confirm the frequency of Trojan heartbeat detection in the session to be fixed; otherwise, to confirm the frequency of Trojan heartbeat detection in the session to be unfixed.

9. The apparatus according to claim 6, wherein the processor is further configured to confirm the characteristic of the message to conform with the characteristic of the Trojan control command message when the characteristic of the message conforms with one or more of the following characteristics: a length of payload of the message is in a third preset range; a field structure of the message is the same as at least one field structure of a Trojan control command stored; encoding of the message regularly varies from encoding of each preceding message; and an operational behavior corresponding to the message is combined with an operational behavior corresponding to each preceding message, according to an order in which the respective messages are sent by the control end, to form a combination of operational behaviors of the session, and the formed combination of operational behaviors of the session is the same as at least one combination of Trojan operational behaviors stored.

10. The apparatus according to claim 6, wherein the processor is further configured, when the recorded session weight reaches a preset threshold, to determine uplink data traffic and downlink data traffic of the controlled end in the current session, to determine the ratio of the uplink data traffic to the downlink data traffic, and to determine a ratio range into which the ratio falls, wherein the preset threshold is smaller than the alarm threshold; and the memory is further configured to increase the recorded session weight by a weight corresponding to the ratio range into which the determined ratio falls according to weights corresponding to respective preset ratio ranges and to record the session weight.

* * * * *